(12) United States Patent
Lee et al.

(10) Patent No.: US 7,945,706 B2
(45) Date of Patent: May 17, 2011

(54) SIGNAL RECEIVING CIRCUIT ADAPTED FOR MULTIPLE DIGITAL VIDEO/AUDIO TRANSMISSION INTERFACE STANDARDS

(75) Inventors: An-Ming Lee, Hsin-Chu Hsien (TW); Tzu-Chien Tzeng, Hsin-Chu (TW); Yu-Pin Chou, Miao- Li Hsien (TW); Tzuo-Bo Lin, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 267 days.

(21) Appl. No.: 12/128,634

(22) Filed: May 29, 2008

(65) Prior Publication Data
US 2009/0015722 A1 Jan. 15, 2009

(30) Foreign Application Priority Data
Jul. 11, 2007 (TW) ................. 96125240 A

(51) Int. Cl.
G06F 3/00 (2006.01)
G06F 13/00 (2006.01)
(52) U.S. Cl. .................. 710/8; 710/15; 710/32; 710/36
(58) Field of Classification Search .................. None
See application file for complete search history.

(56) References Cited

U.S. PATENT DOCUMENTS
6,317,804 B1 11/2001 Levy et al.
7,337,977 B2 3/2008 Chen et al.
7,372,298 B2 5/2008 Chu et al.
2007/0115951 A1* 5/2007 Karaoguz et al. ............. 370/356
2007/0300139 A1* 12/2007 Pisek et al. .................... 714/794

FOREIGN PATENT DOCUMENTS
TW 242378 B 10/2005

OTHER PUBLICATIONS

Ramazani, Monteiro, A multiprocessor architecture for fast packet processing, Dec. 2005, ieeexplore.org [online, accessed on Jan. 12, 2011] URL:http://ieeexplore.ieee.org/stamp/stamp.jsp?tp= &arnumber=4633380.*
English translation of abstract of TW 242378 B.

* cited by examiner

*Primary Examiner* — Tariq Hafiz
*Assistant Examiner* — Scott Sun
(74) *Attorney, Agent, or Firm* — Thomas, Kayden, Horstemeyer & Risley, LLP

(57) ABSTRACT

The invention provides a signal receiving circuit applied to multiple digital video/audio transmission interface standards. The signal receiving circuit includes at least an input interface for receiving an input signal, and at least an interface circuit. The input interface includes a set of shared input terminals, a set of first separate input terminals for receiving an input signal corresponding to a first transmission specification with the set of shared input terminals, and a set of second separate input terminals for receiving an input signal corresponding to a second transmission specification with the set of shared input terminals. The interface circuit includes a control circuit coupled to the input interface for supplying a control signal, and a processing module coupled to the input interface and the control circuit for processing the input signal according to the control signal to generate an output signal.

20 Claims, 6 Drawing Sheets

| Type A pin | Signal Name | Wire | Type A pin |
|---|---|---|---|
| 1 | TMDS D2+ | A | 1 |
| 2 | TMDS Data2 Shield | B | 2 |
| 3 | TMDS Data2- | A | 3 |
| 4 | TMDS Data1+ | A | 4 |
| 5 | TMDS Data1 Shield | B | 5 |
| 6 | TMDS Data1- | A | 6 |
| 7 | TMDS Data0+ | A | 7 |
| 8 | TMDS Data0 Shield | B | 8 |
| 9 | TMDS Data0- | A | 9 |
| 10 | TMDS Clock+ | A | 10 |
| 11 | TMDS Clock Shield | B | 11 |
| 12 | TMDS Clock- | A | 12 |
| 13 | CEC | C | 13 |
| 14 | Reserved(in cable but N.C on device) | | 14 |
| 15 | SCL | C | 15 |
| 16 | SDA | C | 16 |
| 17 | DDC/CEC Ground | D | 17 |
| 18 | +5V Power | 5V | 18 |
| 19 | Hot Plug Detect | C | 19 |

FIG. 1 PRIOR ART

| Pin number | Signal type | Pin description | Mating row contact location | Vertically opposed connector's front view | |
|---|---|---|---|---|---|
| 1 | In | ML_Lane 3(n) | Top | | |
| 2 | GND | GND | Bottom | | |
| 3 | In | ML_Lane 3(p) | Top | | |
| 4 | In | ML_Lane 2(n) | Bottom | | |
| 5 | GND | GND | Top | | |
| 6 | In | ML_Lane 3(n) | Bottom | | |
| 7 | In | ML_Lane 3(n) | Top | | |
| 8 | GND | GND | Bottom | | |
| 9 | In | ML_Lane 1(p) | Top | | |
| 10 | In | ML_Lane 0(n) | Bottom | | |
| 11 | GND | GND | Top | | |
| 12 | In | ML_Lane 0(p) | Bottom | | |
| 13 | GND[2] | GND | Top | | |
| 14 | GND[2] | GND | Bottom | | |
| 15 | I/O | AUX_CH (p) | Top | | |
| 16 | GND | GND | Bottom | | |
| 17 | I/O | AUX_CH (n) | Top | | |
| 18 | Out | Hot Plug Detect | Bottom | | |
| 19 | Power RTN | Return DP_PWR | Top | | |
| 20 | Power In[1] | DP_PWR | Bottom | | |

FIG. 2 PRIOR ART

| UDI Source Pin | Signal | UDI Sink Pin |
|---|---|---|
| 1 | No Connect[1] | 1 |
| 2 | No Connect[1] | 2 |
| 3 | No Connect[1] | 3 |
| 4 | Gnd | 4 |
| 5 | UDI_Data2+ | 5 |
| 6 | UDI_Data2- | 6 |
| 7 | Gnd | 7 |
| 8 | UDI_Data1+ | 8 |
| 9 | UDI_Data1- | 9 |
| 10 | Gnd | 10 |
| 11 | UDI_Data0+ | 11 |
| 12 | UDI_Data0- | 12 |
| 13 | Gnd | 13 |
| 14 | UDI_Clk+ | 14 |
| 15 | UDI_Clk- | 15 |
| 16 | Gnd | 16 |
| 17 | No Connect[1] | 17 |
| 18 | No Connect[1] | 18 |
| 19 | UDI_CtrlClk | 19 |
| 20 | UDI_CtrlData | 20 |
| 21 | No Connect[1] | 21 |
| 22 | UDI_HPD | 22 |
|  | Connector shell |  |

FIG. 3 PRIOR ART

SIGNAL RECEIVING CIRCUIT ADAPTED FOR MULTIPLE DIGITAL VIDEO/AUDIO TRANSMISSION INTERFACE STANDARDS

BACKGROUND OF THE INVENTION

1. Field of the Invention

The present invention relates to digital video/audio transmission interface standards, and more particularly, to a signal receiving circuit adapted for multiple digital video/audio transmission interface standards.

2. Description of the Prior Art

At present, high-speed digital video/audio transmission interface standards are becoming mainstream application for the transmission interface of video/audio displaying devices, such standards including high-definition multimedia interface (HDMI), DisplayPort, or universal display port (UDI). If a single integrated circuit (IC) needs to include the possibility of supporting several digital transmission interfaces, conventionally it is required to provide, in the IC for every digital transmission interface, a separate set of pins and pads, and/or provide a separate set of hardware to process the varied input signals received from the individual digital transmission interfaces. This usually has the disadvantage such as increased pin number as well as expanded hardware area.

The above-mentioned three types of mainstream high-speed digital video/audio transmission interface standards all utilize differential pairs to achieve the objective of high-speed transmission of a digital signal. Please refer to FIGS. 1~3. FIG. 1 is a pin definition table for HDMI. FIG. 2 is a pin definition table for DisplayPort. FIG. 3 is a pin definition table for UDI. As shown in FIGS. 1~3, the HDMI utilizes pin numbers 1, 3, 4, 6, 7, 9, 10, and 12 to transmit the high-speed video/audio data, the DisplayPort utilizes pin numbers 1, 3, 4, 6, 7, 9, 10, and 12 to transmit the high-speed video/audio data, and the UDI utilizes pin numbers 5, 6, 8, 9, 11, 12, 14, and 15 to transmit the high-speed video/audio data. That is to say, the three types of high-speed digital video/audio transmission interface standards each utilizes four sets of differential pair pins as the main input terminals for transmitting the video/audio data. How to make good use of this technical characteristic is a main objective of the present invention.

SUMMARY OF THE INVENTION

It is therefore one of the objectives of the present invention to provide a signal receiving circuit adapted for multiple digital video/audio transmission interface standards, which utilizes an identical set of pads to receive the differential signals of various digital video/audio transmission interface standards in different modes, in order to solve the above-mentioned problem.

According to an exemplary embodiment of the present invention, a signal receiving circuit adapted for multiple digital video/audio transmission interface standards is disclosed. The signal receiving circuit comprises at least an input interface and at least an interface circuit. The input interface is used for receiving an input signal and comprises a set of shared input terminals, a set of first separate input terminals and a set of second separate input terminals. The set of first separate input terminals is used for receiving the input signal corresponding to a first transmission specification with the set of shared input terminals, and the set of second separate input terminals is used for receiving the input signal corresponding to a second transmission specification with the set of shared input terminals. The interface circuit comprises a control circuit and a processing module. The control circuit is coupled to the input interface and is used for supplying a control signal. The processing module is coupled to the input interface and the control circuit and is used for processing the input signal according to the control signal to generate an output signal.

According to an exemplary embodiment of the present invention, another signal receiving circuit adapted for multiple digital video/audio transmission interface standards is also disclosed. The signal receiving circuit comprises a plurality of input interfaces, a plurality of interface circuits, a plurality of multiplexers and a multiplexer controlling circuit. Each input interface is used for receiving an input signal and comprises a set of shared input terminals, a set of first separate input terminals and a set of second separate input terminals. The set of first separate input terminals is used for receiving the input signal corresponding to a first transmission specification with the set of shared input terminals, and the set of second separate input terminals is used for receiving the input signal corresponding to a second transmission specification with the set of shared input terminals. Each interface circuit comprises a control circuit and a processing module. The control circuit is coupled to the input interface and is used for supplying a control signal. The processing module is coupled to the input interface and the control circuit and is used for processing the input signal according to the control signal to generate an output signal. Each multiplexer is coupled to the plurality of input interfaces and a corresponding interface circuit. The multiplexer controlling circuit is coupled to the plurality of multiplexers, and is used for controlling at least one separate multiplexer of the plurality of multiplexers to select one of the plurality of input interfaces and allow the output of the input interface to be outputted to a separate interface circuit corresponding to the separate multiplexer.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a pin definition table for HDMI.
FIG. 2 is a pin definition table for DisplayPort.
FIG. 3 is a pin definition table for UDI.

DETAILED DESCRIPTION

It should be noted that the technique disclosed in the present invention can be applied to multimedia, computer, and electronic appliance products with any type of high-speed digital video/audio transmission interface standard, as well as controller chips therein, which may include, but not limited to, an LCD monitor controller chip, an LCD TV controller chip, a digital TV controller chip, a digital video recorder (DVR) controller chip, etc.

Figure 4:
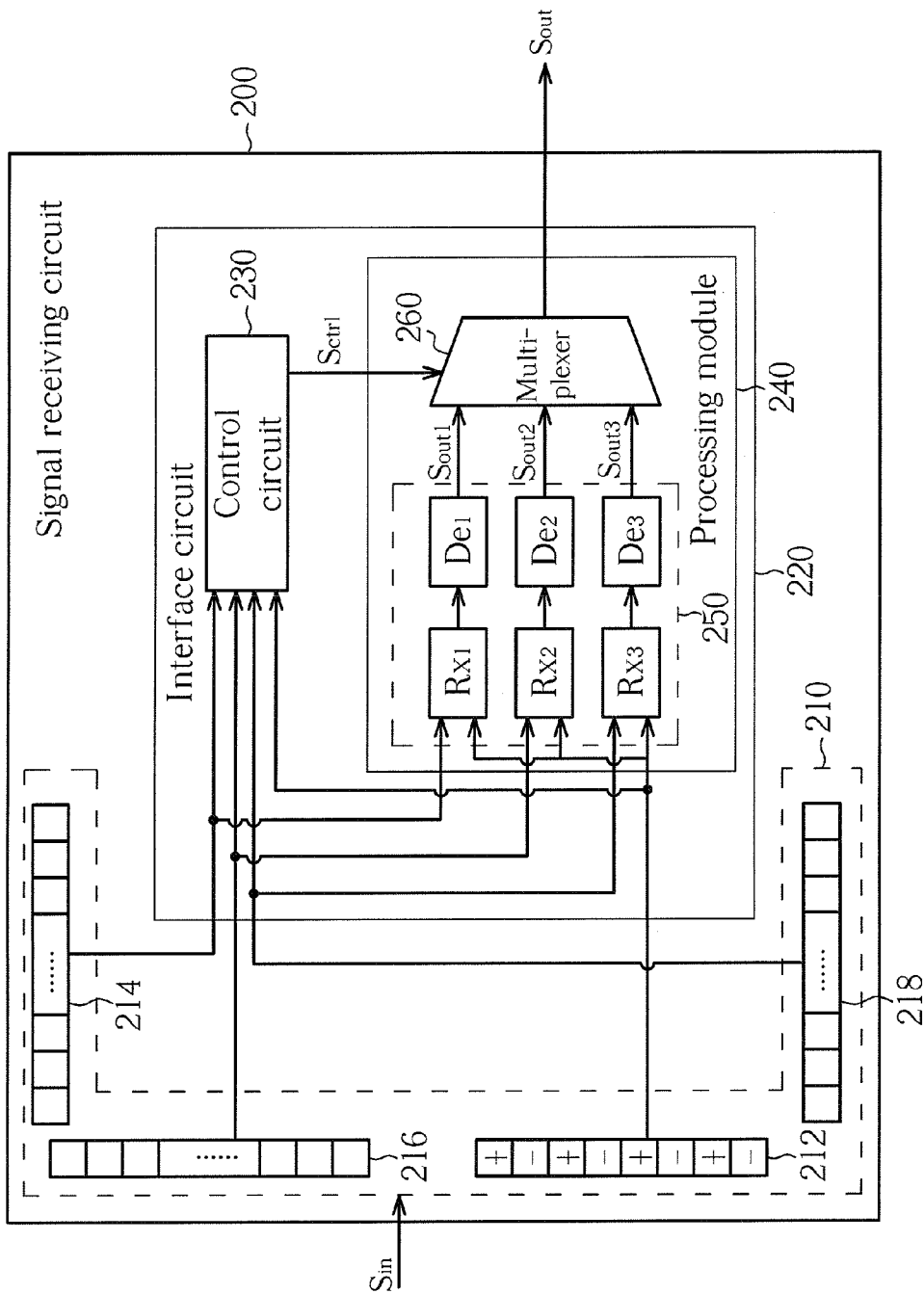
FIG. 4 is a block diagram illustrating a signal receiving circuit according to a first exemplary embodiment of the present invention.

Please refer to FIG. 4. FIG. 4 is a block diagram illustrating a signal receiving circuit 200 according to a first exemplary embodiment of the present invention. In this embodiment, the signal receiving circuit 200 comprises an input interface 210 and an interface circuit 220. The signal receiving circuit 200 is explained herein with an example of an integrated circuit such as an LCD monitor controller chip. The input interface 210 is generally composed of a plurality of bonding pads, and the interface circuit 220 is implemented by an integrated circuit.

The input interface 210 is used for receiving an input signal Sin. In this embodiment, the input signal Sin can be a signal corresponding to HDMI, a signal corresponding to DisplayPort, or a signal corresponding to UDI; however, the present invention is not limited to these examples. The input interface 210 comprises a set of shared input terminals 212, a set of first separate input terminals 214, a set of second separate input terminals 216, and a set of third separate input terminals 218, wherein the set of first separate input terminals 214 and the set of shared input terminals 212 are used for receiving the input signal Sin corresponding to HDMI, the set of second separate input terminals 216 and the set of shared input terminals 212 are used for receiving the input signal Sin corresponding to DisplayPort, and the set of third separate input terminals 218 and the set of shared input terminals 212 are used for receiving the input signal Sin corresponding to UDI. As mentioned above, the three types of transmission interface standards all take four sets of differential pair pins as the main input terminals for transmitting video/audio data; therefore, the set of shared input terminals 212 has four sets of differential pair pins in total, which are capable of receiving the data of three types of transmission interface standards. Please note that there are three sets of separate input terminals, and the three sets of separate input terminals respectively correspond to the other pins (apart from the four sets of differential pair pins) of HDMI, DisplayPort, and UDI in this embodiment. This, however, is merely for exemplifying purposes, and is not meant to be a limitation of the present invention.

The input interface 210 of the signal receiving circuit 200 comprises a control circuit 230 and a processing module 240. The control circuit 230 is coupled to the input interface 210 and is used for supplying a control signal Sctrl. The processing module 240 is coupled to the input interface 210 and the control circuit 230, and is used for processing the input signal Sin according to the control signal Sctrl, so as to generate an output signal Sout. In this embodiment, the processing module 240 comprises a front-end processing circuit 250 and a multiplexer 260. The front-end processing circuit 250 comprises three receivers Rx1, Rx2, and Rx3, and three decoders De1, De2, and De3. Please note that, in the front-end processing circuit 250, the receiver Rx1 and the decoder De1 are configured to process the signal corresponding to HDMI, the receiver Rx2 and the decoder De2 are configured to process the signal corresponding to DisplayPort, and the receiver Rx3 and the decoder De3 are configured to process the signal corresponding to UDI.

The receiver Rx1 is coupled to the set of shared input terminals 212 and the set of first separate input terminals 214 for receiving the output of the set of shared input terminals 212 and the set of first separate input terminals 214. The decoder De1 is coupled to the receiver Rx1 and the multiplexer 260 for decoding the output of the receiver Rx1 and generating a first processed signal Sout1. Similarly, the receiver Rx2 is coupled to the set of shared input terminals 212 and the set of second separate input terminals 216 for receiving the output of the set of shared input terminals 212 and the set of second separate input terminals 216. The decoder De2 is coupled to the receiver Rx2 and the multiplexer 260 for decoding the output of the receiver Rx2 and generating a second processed signal Sout2. The receiver Rx3 is coupled to the set of shared input terminals 212 and the set of third separate input terminals 218 for receiving the output of the set of shared input terminals 212 and the set of third separate input terminals 218. The decoder De3 is coupled to the receiver Rx3 and the multiplexer 260 for decoding the output of the receiver Rx3 and generating a third processed signal Sout3.

Please note that only one of the first processed signal Sout1, the second processed signal Sout2, and the third processed signal Sout3 will be the correct processed signal. For example, if the input signal Sin corresponds to HDMI, the first processed signal Sout1 received from the set of shared input terminals 212 and the set of first separate input terminals 214 will be the correct processed signal (i.e., when signal processing for HDMI is performed on the input signal corresponding to HDMI); and the second processed signal Sout2 and the third processed signal Sout3 result in incorrect processed signals.

Therefore, the control circuit 230 will determine which transmission standard corresponds to the input signal Sin delivered from the input interface 210. According to the determined transmission standard, the control signal Sctrl is correctly generated. The Sctrl is further used for controlling the multiplexer 260 in the processing module 240 to select the correct processed signal as the output signal Sout from the three processed signals Sout1, Sout2, and Sout3. In the above example, the control circuit 230 will determine that the input signal Sin currently delivered from the input interface 210 corresponds to HDMI, and output the control signal Sctrl to the multiplexer 260, which controls the multiplexer 260 to output the first processed signal Sout1 as the output signal Sout.

Figure 5:
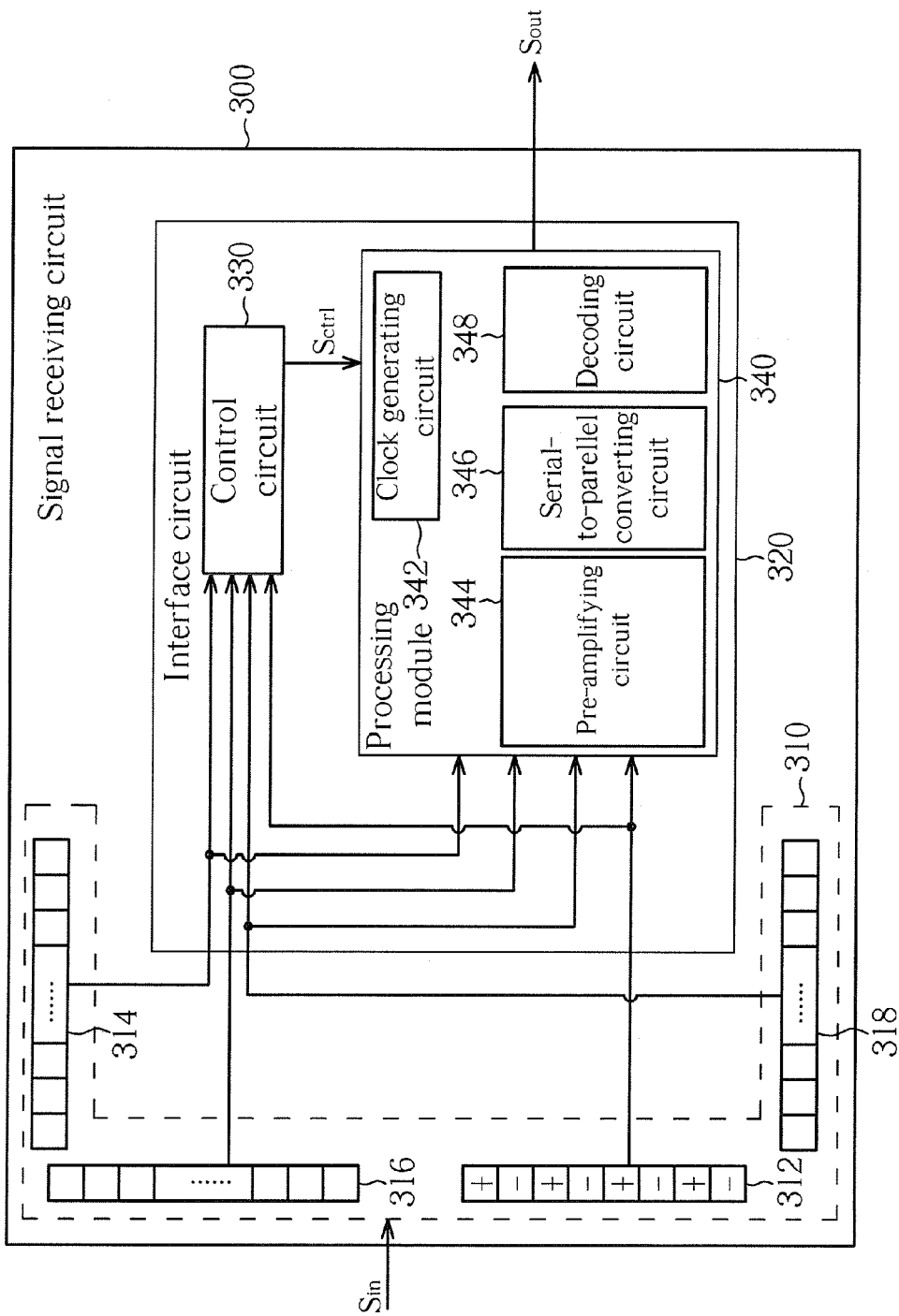
FIG. 5 is a block diagram illustrating a signal receiving circuit according to a second exemplary embodiment of the present invention.

Please note that, in this embodiment, the processing module 240 comprises the front-end processing circuit 250 and the multiplexer 260; however, this serves only as an example and is not meant to be a limitation of the present invention. In other words, the processing module 240 can be implemented in other ways. Please refer to FIG. 5. FIG. 5 is a block diagram illustrating a signal receiving circuit 300 according to a second exemplary embodiment of the present invention. Similar to the above signal receiving circuit 200, the signal receiving circuit 300 also comprises an input interface 310 and an interface circuit 320, and the interface circuit 320 also comprises a control circuit 330 and a processing module 340. Because operations and functions of the input interface 310 and the control circuit 330 in the interface circuit 320 are similar to those of the input interface 210 and the control circuit 230 in the interface circuit 220, further descriptions are not detailed herein for the sake of brevity.

The processing module 340 selects, out of a plurality of signal processing modes, a signal processing mode that corresponds to the transmission specification of the input signal Sin according to the control signal Sctrl generated by the control circuit 330, and processes the input signal Sin according to the selected signal processing mode to generate the output signal. In this embodiment, the processing module 340 of the signal receiving circuit 300 comprises a clock generating circuit 342, a pre-amplifying circuit 344, a serial-to-parallel converting circuit 346, and a decoding circuit 348. The clock generating circuit 342 is used for generating a clock signal according to the control signal Sctrl. The pre-amplifying circuit 344 is used for adjusting the swing of the input signal Sin according to the control signal Sctrl to generate an adjusted input signal. The serial-to-parallel converting circuit 346 is coupled to the pre-amplifying circuit 344, and is used for performing a serial-to-parallel converting operation on the adjusted input signal according to the clock signal. The decoding circuit 348 is coupled to the clock generating circuit 342, and is used for decoding the output of the serial-to-parallel converting circuit 346 according to the control signal Sctrl, to generate the output signal Sout. For example, if the control circuit 330 determines that the input signal Sin delivered from the input interface 310 corresponds to HDMI, the control circuit 330 will output the control signal Sctrl to the processing module 340. Then, the processing module 340, according to the control signal Sctrl, adjusts the clock signal generated by the clock generating circuit 342, the swing of the pre-amplifying circuit 344, and the decoding scheme of the decoding circuit 348, to allow the signal processing mode of the processing module 340 correctly corresponding to HDMI, so as to process the input signal Sin corresponding to HDMI specification.

Please note that the control circuit 230 of the signal receiving circuit 200 or the control circuit 330 of the signal receiving circuit 300 operates according to the input signal Sin delivered from the input interface 210 of the signal receiving circuit 200 or the input interface 310 of the signal receiving circuit 300, to determine which transmission specification the present input signal Sin corresponds to, so as to generate the control signal Sctrl. These examples, however, are only for illustrative purpose, and are not meant to be taken as limitations of the present invention. For example, in other embodiments of the present invention, if the transmission specification of the apparatus the signal receiving circuits 200, 300 are applied to is known (e.g., the IC having the signal receiving circuit is configured to receive the signal corresponding to HDMI), a transmission specification setting value can be stored in the control circuit in advance. The control circuit can then determine the control signal Sctrl directly according to the transmission specification setting value without dynamically checking which transmission specification the input signal Sin corresponds to.

Figure 6:
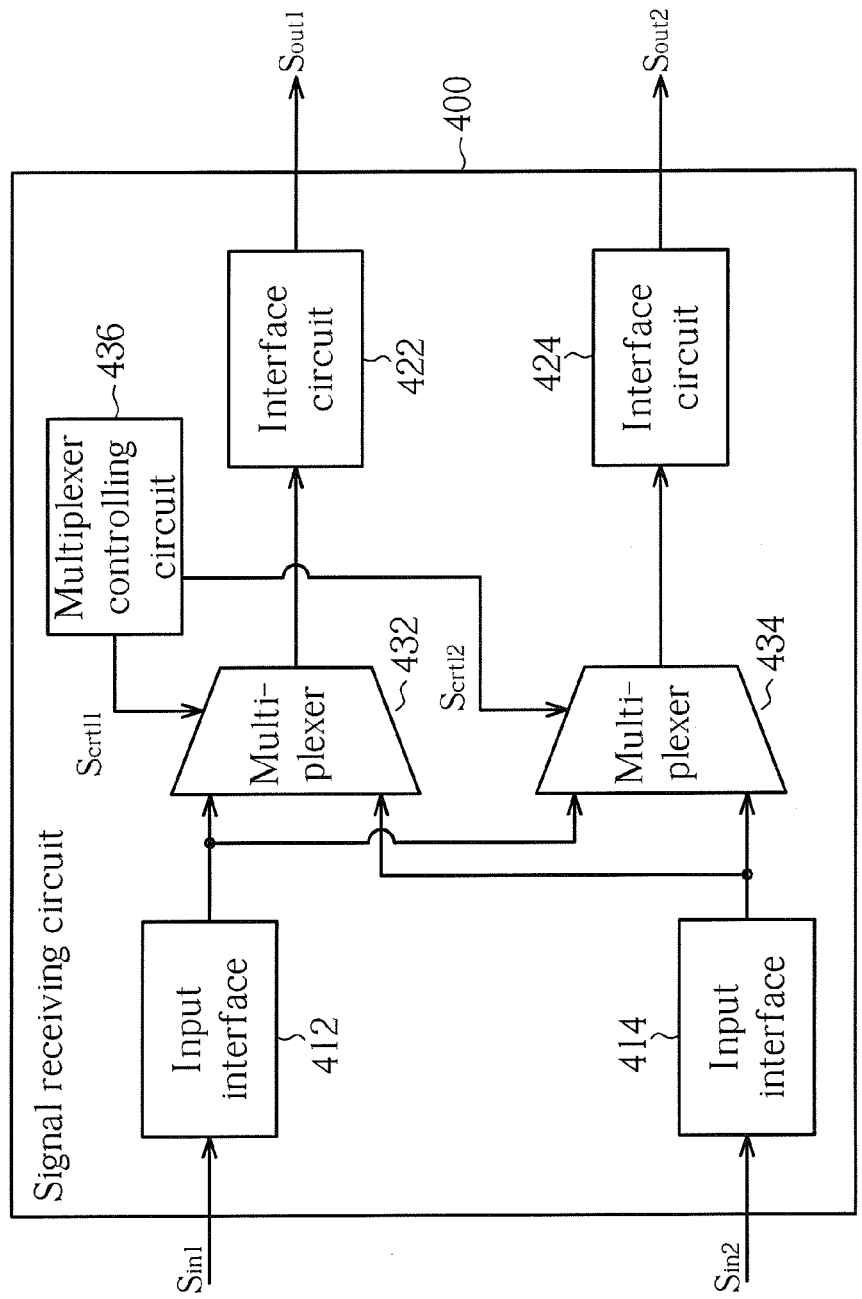
FIG. 6 is a block diagram illustrating a signal receiving circuit according to a third exemplary embodiment of the present invention.

Furthermore, the signal receiving circuit disclosed in the present invention can even support receiving a plurality of input signals, and performs an appropriate signal process on each input signal according to the transmission specification thereof. Please refer to FIG. 6. FIG. 6 is a block diagram illustrating a signal receiving circuit 400 according to a third exemplary embodiment of the present invention. The signal receiving circuit 400 comprises a first input interface 412, a second input interface 414, a first interface circuit 422, a second interface circuit 424, a first multiplexer 432, a second multiplexer 434, and a multiplexer controlling circuit 436. In this embodiment, the first input interface 412 is used for receiving a first input signal Sin1, and the second input interface 414 is used for receiving a second input signal Sin2. The first multiplexer 432 is coupled to the first input interface 412, the second input interface 414, and the first interface circuit 422, while the second multiplexer 434 is coupled to the first input interface 412, the second input interface 414, and the second interface circuit 424. The multiplexer controlling circuit 436 is coupled to the first multiplexer 432 and the second multiplexer 434, and transmits control signals Sctrl1 and Sctrl2 respectively to the first multiplexer 432 and the second multiplexer 434. Then, the first multiplexer 432 outputs one input signal, selected from the first input signal Sin1 and the second input signal Sin2 according to the control signal Sctrl1, to the first interface circuit 422. Similarly, the second multiplexer 434 outputs one input signal, selected from the first input signal Sin1 and the second input signal Sin2 according to the control signal Sctrl2, to the second interface circuit 424. Next, the first interface circuit 422 performs a signal processing operation on the output received from the first multiplexer 432 according to the transmission specification thereof, and outputs a first output signal Sout1. Similarly, the second interface circuit 424 performs a signal processing operation on the output received from the second multiplexer 434 according to the transmission specification thereof, and outputs a second output signal Sout2. Either the first interface circuit 422 or the second interface circuit 424 can be implemented by the interface circuit 220 in the first embodiment or the interface circuit 320 in the second embodiment. In this embodiment, it should be noted that the signal receiving circuit 400 can support receiving two input signals at the same time; however, this is not a limitation of the present invention. In other embodiments, the signal receiving circuit disclosed in the present invention can receive N input signals (N>2) at the same time depending on design requirements, and this also conforms to the spirit of the present invention.

Please note that in the above-described embodiments the differential pair transmission specification is used as an example for illustrating characteristics of the present invention; however, after reading and understanding the above-mentioned description, how to apply the structure of the present invention in single end transmission specification should be readily appreciated by those skilled in the art. In other words, for a differential pair application the set of shared input terminals comprises at least two pins, in order to receive at least a differential input signal; while for a single end application the set of shared input terminals comprises at least one pin, in order to receive at least a single end input signal.

Briefly summarized, the signal receiving circuit disclosed in the present invention utilizes a set of shared input terminals to receive the part of the signal(s) with the same characteristic (e.g., the above-mentioned differential signal pairs) of the input signal of various transmission specification. It then becomes not required to provide every digital transmission interface with a separate set of pins and pads, nor multiplicity of sets of hardware to process the various input signals received from the different digital transmission interfaces in the identical IC. In this way, both the number of pins in the IC and the hardware area can be reduced, and the manufacturing cost can thus be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal receiving circuit applied to multiple digital video/audio transmission interface standards, comprising:
   at least an input interface, for receiving an input signal, the input interface comprising:
     a set of shared input terminals;
     a set of first separate input terminals, wherein when the input signal corresponds to a first transmission specification, the set of shared input terminals is used for receiving a first portion of the input signal corresponding to the first transmission specification and the set of first separate input terminals is used for receiving a second portion of the input signal corresponding to the first transmission specification; and
     a set of second separate input terminals, wherein when the input signal corresponds to a second transmission specification, the set of shared input terminals is used for receiving a first portion of the input signal corresponding to the second transmission specification and the set of second separate input terminals is used for receiving a second portion of the input signal corresponding to the second transmission specification;

wherein the set of first separate input terminals are distinct from the set of second input terminals, wherein the first portion of the input signal corresponding to the first transmission specification is less than the entire input signal corresponding to the first transmission specification, and wherein the first portion of the input signal corresponding to the second transmission specification is less than the entire input signal corresponding to the second transmission specification; and at least an interface circuit, comprising:
a control circuit, coupled to the input interface, for supplying a control signal; and
a processing module, coupled to the input interface and the control circuit, for processing input signals according to the control signal to generate an output signal.

2. The signal receiving circuit of claim 1, wherein the control circuit supplies the control signal by analyzing the input signal to identify a transmission specification of the input signal.

3. The signal receiving circuit of claim 1, wherein the control circuit stores a transmission specification setting value, and the control circuit supplies the control signal directly according to the transmission specification setting value.

4. The signal receiving circuit of claim 1, wherein the processing module comprises:
a front-end processing circuit, coupled to the input interface, for receiving the input signal and processing the input signal respectively according to a first signal processing mechanism corresponding to the first transmission specification and a second processing mechanism corresponding to the second transmission specification to generate a plurality of processed signals; and
a multiplexer, coupled to the front-end processing circuit, for outputting a processed signal corresponding to the transmission specification of the input signal from the plurality of processed signals as the output signal.

5. The signal receiving circuit of claim 4, wherein the front-end processing circuit comprises:
a first receiver, coupled to the set of shared input terminals and the set of first separate input terminals;
a second receiver, coupled to the set of shared input terminals and the set of second separate input terminals;
a first decoder, coupled to the first receiver and the multiplexer, for decoding the output of the first receiver to generate a first processed signal to the multiplexer; and
a second decoder, coupled to the second receiver and the multiplexer, for decoding the output of the second receiver to generate a second processed signal to the multiplexer.

6. The signal receiving circuit of claim 1, wherein the processing module determines a signal processing mode corresponding to the transmission specification of the input signal from a plurality of signal processing modes according to the control signal, and processes the input signal according to the signal processing mode to generate the output signal.

7. The signal receiving circuit of claim 1, wherein the processing module comprises:
a pre-amplifying circuit, for adjusting a swing of the input signal according to the control signal to generate an adjusted input signal;
a clock generating circuit, for generating a clock signal according to the control signal;
a serial-to-parallel converting circuit, coupled to the pre-amplifying circuit, for performing a serial-to-parallel converting operation on the adjusted input signal according to the clock signal; and
a decoding circuit, coupled to the clock generating circuit, for decoding an output of the serial-to-parallel converting circuit according to the control signal to generate the output signal.

8. The signal receiving circuit of claim 1, comprising a plurality of input interfaces and a plurality of interface circuits, and further comprising:
a plurality of multiplexers, each coupled to the plurality of input interfaces and a corresponding interface circuit; and
a multiplexer controlling circuit, coupled to the plurality of multiplexers, for controlling at least one separate multiplexer of the plurality of multiplexers to select a separate input interface from the plurality of input interfaces and allow an output of the separate input interface to be outputted to a separate interface circuit corresponding to the separate multiplexer.

9. A signal receiving circuit applied to multiple digital video/audio transmission interface standards, comprising:
a plurality of input interfaces, each of the input interfaces being utilized for receiving an input signal and comprising:
a set of shared input terminals;
a set of first separate input terminals, wherein when the input signal corresponds to a first transmission specification, the set of shared input terminals is used for receiving a first portion of the input signal corresponding to the first transmission specification and the set of first separate input terminals is used for receiving a second portion of the input signal corresponding to the first transmission specification, wherein both the first portion and the second portion of the input signal corresponding to the first transmission specification is less than the entire input signal and both the first portion and the second portion of the input signal are different from each other; and
a set of second separate input terminals, wherein when the input signal corresponds to a second transmission specification, the set of shared input terminals is used for receiving a first portion of the input signal corresponding to the second transmission specification and the set of second separate input terminals is used for receiving a second portion of the input signal corresponding to the second transmission specification;
a plurality of interface circuits, each of the interface circuits comprising:
a control circuit, coupled to the plurality of input interfaces, for supplying a control signal; and
a processing module, coupled to the control circuit, for processing the input signal according to the control signal to generate an output signal;
a plurality of multiplexers, each of the multiplexers being coupled to the plurality of input interfaces and a corresponding interface circuit; and
a multiplexer controlling circuit, coupled to the plurality of multiplexers, for controlling at least one separate multiplexer of the plurality of multiplexers to select a separate input interface from the plurality of input interfaces and allow an output of the separate input interface to be outputted to a separate interface circuit corresponding to the separate multiplexer.

10. The signal receiving circuit of claim 9, wherein the control circuit supplies the control signal by analyzing the input signal to identify a transmission specification of the input signal.

11. The signal receiving circuit of claim 9, wherein the control circuit stores a transmission specification setting value, and the control circuit supplies the control signal directly according to the transmission specification setting value.

12. The signal receiving circuit of claim 9, wherein the processing module comprises:
- a front-end processing circuit, coupled to the input interface, for receiving the input signal and processing the input signal respectively according to a first signal processing mechanism corresponding to the first transmission specification and a second processing mechanism corresponding to the second transmission specification to generate a plurality of processed signals; and
- a multiplexer, coupled to the front-end processing circuit, for outputting a processed signal corresponding to the transmission specification of the input signal from the plurality of processed signals as the output signal.

13. The signal receiving circuit of claim 9, wherein the processing module determines a signal processing mode corresponding to the transmission specification of the input signal from a plurality of signal processing modes according to the control signal, and processes the input signal according to the signal processing mode to generate the output signal.

14. A signal receiving circuit applied to multiple digital video/audio transmission interface standards, comprising:
- at least an input interface, for receiving an input signal, the input interface comprising:
  - a set of shared input terminals;
  - a set of first separate input terminals, which are separate and distinct from the set of shared input terminals, for receiving an input signal corresponding to a first transmission specification with the set of shared input terminals; and
  - a set of second separate input terminals, which are separate and distinct from both the set of shared input terminals and the set of first separate input terminals, for receiving an input signal corresponding to a second transmission specification with the set of shared input terminals; and
- at least an interface circuit, comprising:
  - a control circuit, coupled to the input interface, for supplying a control signal by analyzing the input signal to identify a transmission specification of the input signal; and
  - a processing module, coupled to the input interface and the control circuit, for processing input signals according to the control signal to generate an output signal.

15. The signal receiving circuit of claim 14, wherein the control circuit stores a transmission specification setting value, and the control circuit supplies the control signal directly according to the transmission specification settings value.

16. The signal receiving circuit of claim 14, wherein the processing module comprises:
- a front-end processing circuit, coupled to the input interface, for receiving the input signal and processing the input signal respectively according to a first signal processing mechanism corresponding to the first transmission specification and a second processing mechanism corresponding to the second transmission specification to generate a plurality of processed signals; and
- a multiplexer, coupled to the front-end processing circuit, for outputting a processed signal corresponding to the transmission specification of the input signal from the plurality of processed signals as the output signal.

17. The signal receiving circuit of claim 16, wherein the front-end processing circuit comprises:
- a first receiver, coupled to the set of shared input terminals and the set of first separate input terminals;
- a second receiver, coupled to the set of shared input terminals and the set of second separate input terminals;
- a first decoder, coupled to the first receiver and the multiplexer, for decoding the output of the first receiver to generate a first processed signal to the multiplexer; and
- a second decoder, coupled to the second receiver and the multiplexer, for decoding the output of the second receiver to generate a second processed signal to the mutliplexer.

18. The signal receiving circuit of claim 14, wherein the processing module determines a signal processing mode corresponding to the transmission specification of the input signal from a plurality of signal processing modes according to the control signal, and processes the input signal according to the signal processing mode to generate the output signal.

19. The signal receiving circuit of claim 14, wherein the processing module comprises:
- a pre-amplify circuit, for adjusting a swing of the input signal according to the control signal to generate an adjusted input signal;
- a clock generating circuit, for generating a clock signal according to the control signal;
- a serial-to-parallel converting circuit, coupled to the pre-amplifying circuit, for performing a serial-to-parallel converting operation on the adjusted input signal according to the clock signal; and
- a decoding circuit, coupled to the clock generating circuit, for decoding an output of the serial-to-parallel converting circuit according to the control signal to generate the output signal.

20. The signal receiving circuit of claim 14, comprising a plurality of input interfaces and a plurality of interface circuits, and further comprising:
- a plurality of multiplexers, each coupled to the plurality of input interfaces and a corresponding interface circuit; and
- a multiplexer controlling circuit, coupled to the plurality of multiplexers, for controlling at least one separate multiplexer of the plurality of multiplexers to select a separate input interface from the plurality of input interfaces and allow an output of the separate input interface to be outputted to a separate interface circuit corresponding to the separate multiplexer.

* * * * *